(12) United States Patent
Chiu et al.

(10) Patent No.: US 11,148,078 B2
(45) Date of Patent: Oct. 19, 2021

(54) FILTERING DEVICE

(71) Applicant: MICRO PLASTIC CLEANSER CO., LTD., Taoyuan (TW)

(72) Inventors: Shen-Fu Chiu, Taoyuan (TW); Yi-Jou Hung, Taoyuan (TW)

(73) Assignee: MICRO PLASTIC CLEANSER CO., LTD., Taoyuan (TW)

(*) Notice: Subject to any disclaimer, the term of this patent is extended or adjusted under 35 U.S.C. 154(b) by 0 days.

(21) Appl. No.: 16/852,410

(22) Filed: Apr. 18, 2020

(65) Prior Publication Data
US 2020/0330909 A1  Oct. 22, 2020

Related U.S. Application Data

(60) Provisional application No. 62/836,070, filed on Apr. 18, 2019.

(51) Int. Cl.
| | |
|---|---|
| *B01D 29/44* | (2006.01) |
| *B01D 29/31* | (2006.01) |
| *C02F 1/00* | (2006.01) |
| *B01D 35/28* | (2006.01) |
| *C02F 103/42* | (2006.01) |
| *C02F 103/00* | (2006.01) |

(52) U.S. Cl.
CPC ............ *B01D 29/31* (2013.01); *B01D 29/44* (2013.01); *B01D 35/28* (2013.01); *C02F 1/004* (2013.01); *C02F 2103/007* (2013.01); *C02F 2103/42* (2013.01)

(58) Field of Classification Search
CPC ...... B01D 29/44; B01D 29/925; B01D 35/02; B01D 35/28; Y10T 137/794; Y10T 137/7976; Y10T 137/85938

USPC ......... 210/162, 170.1, 433.1, 446, 456, 459; 137/544, 545, 561 A
See application file for complete search history.

(56) References Cited

U.S. PATENT DOCUMENTS

| | | | | |
|---|---|---|---|---|
| 2,660,317 A | * | 11/1953 | Mork ..................... | B01D 35/02 210/434 |
| 3,693,796 A | * | 9/1972 | Michel ................... | B01D 21/02 210/170.1 |
| 3,817,383 A | * | 6/1974 | Michel ................... | E02B 15/02 210/170.1 |
| 4,003,836 A | * | 1/1977 | Stearns ................ | B01D 29/925 210/456 |

(Continued)

*Primary Examiner* — Christopher Upton
(74) *Attorney, Agent, or Firm* — Chieh-Mei Wang

(57) ABSTRACT

The disclosure provides a filtering device comprising a housing, a blocking member and a screening member. The housing includes a body, an inlet end and an outlet end. The housing forms an accommodation space. The inlet end and the outlet end are respectively formed at two ends of the accommodating space. The inlet end is capable of receiving fluid. The blocking member is capable of splitting the fluid into a plurality of fluids and collecting the non-fluid composition of the secondary fluid having a first size. The screening member is disposed between the inlet end and the blocking member, and the screening member is configured to receive the secondary fluid to limit the non-fluid composition having a second size of the secondary fluid to the screening member. After the secondary fluid passes through the shield and the screening member, the secondary fluid is output from the outlet end.

9 Claims, 4 Drawing Sheets

(56) References Cited

U.S. PATENT DOCUMENTS

| | | | | |
|---|---|---|---|---|
| 4,523,992 A | * | 6/1985 | Sackett | B01D 35/14 |
| | | | | 210/456 |
| 4,578,188 A | * | 3/1986 | Cousino | E03F 5/12 |
| | | | | 137/561 A |
| 5,681,455 A | * | 10/1997 | Takai | E03B 3/02 |
| | | | | 210/162 |
| 5,709,051 A | * | 1/1998 | Mazziotti | E04D 13/076 |
| | | | | 210/162 |
| 2016/0033048 A1 | * | 2/2016 | Noah | E04D 13/08 |
| | | | | 137/544 |

* cited by examiner

16

FILTERING DEVICE

CROSS-REFERENCE TO RELATED APPLICATION

The present disclosureclaims the benefit of U.S. provisional patent application No. 62/836,070, filed on Apr. 18, 2019, the entirety of which is incorporated herein by reference.

FIELD OF THE INVENTION

The present disclosure relates to a technical field of water purification, particularly, to a filtering device for capturing impurities of various sizes.

BACKGROUND OF THE INVENTION

The characteristics of plastic include chemical stability, heat resistant, insulating, firm, shapeable, low price, etc., making it widely used in commercial production, further resulting in revolution in many aspects of our everyday life.

However, plastic besides being an indispensable daily necessity in our life also unknowingly fills up the entire ocean, lake, tap drinking water, artificial breeding pond, etc.

In particular, large quantities of micro/nano plastic particles with diameters smaller than 5 millimeters that are invisible to human eyes have entered into the vast food chain, which is rather worrisome.

Furthermore, ecotoxicity released by persistent organic pollutants absorbed on plastics would not only affect the growth and hormones of living things but also destruct habitats.

In view of the above, the present disclosure provides a filtering device capable of overcoming the aforementioned shortcomings of the prior art.

SUMMARY OF THE INVENTION

The first objective of the present disclosure is to provide a filtering device for filtering fluids to achieve the purpose of purification.

The second objective of the present disclosure is to provide said filtering device which through natural energies (such as waves, water flow, solar power, etc.) can achieve the purpose of automatic water purification.

The third objective of the present disclosure is to provide said filtering device which through electrical machinery (or called motor) expedites the capturing of impurities.

The fourth objective of the present disclosure is to provide said filtering device which through various mechanisms can capture impurities of different sizes, thereby effectively classify the impurities.

The fifth objective of the present disclosure is to provide said filtering device which, through a cover having slits, is capable of easily disposing the filtering device in an environment having living organisms without hurting those living organisms.

The sixth objective of the present disclosure is to provide said filtering device which can be reused through recycling impurities to achieve the purpose of repetitive use.

The seventh objective of the present disclosure is to provide said filtering device which, through a blocking member, is capable of splitting the fluid into a plurality of secondary fluids.

In order to achieve the aforesaid objectives among others, an embodiment of the present disclosure provides a filtering device capable of purifying a fluid having a first flow rate. The filtering device comprises a housing, a blocking member and a screening member. The housing includes a body, an inlet end and an outlet end. The housing forms an accommodating space. The inlet end and the outlet end are respectively formed at two ends of the accommodating space. The inlet end is capable of receiving fluid. The blocking member is disposed in the accommodating space. The blocking member divides the accommodating space into a first subspace and a second subspace. The blocking member is capable of splitting the fluid into a plurality of secondary fluids and collecting the non-fluid composition of the secondary fluid having a first size. Furthermore, the blocking member establishes a channel between the first subspace and the second subspace. The screening member is disposed between the inlet end and the blocking member, and the screening member is configured to receive the plurality of secondary fluids to limit the non-fluid composition having a second size of the secondary fluids to the screening member. After the secondary fluids pass through the blocking member and the screening member, the secondary fluids are entered from the first subspace into the second subspace through the channel, and then outputted from the outlet end connected to the second subspace.

Compared to the prior art, the filtering device disclosed in the embodiments of the present disclosureis capable of effectively separating the impurities (such as decomposable waste, non-decomposable waster, plastic particles, etc.) from fluid (such as ocean, lake, pond, etc.) to purify the fluid. The present disclosure may be applied to technical fields such as aquaculture industry, electroplating industry, environmental engineering, water resources utilization, etc.

DETAILED DESCRIPTION OF THE PREFERRED EMBODIMENTS

In order to fully comprehend the objectives, features and efficacy of the present disclosure, a detailed description is described by the following substantial embodiments in conjunction with the accompanying drawings. The description is as below.

The description of unit, element and component in the present disclosure uses "one", "a", or "an". The way mentioned above is for convenience, and for general meaning of the category of the present disclosure. Therefore, the description should be understood as "include one", "at least one", and include the singular and plural forms at the same time unless obvious meaning.

The description of comprise, have, include, contain, or another similar semantics has the non-exclusive meaning. For example, an element, structure, product, or device contain multi requirements are not limited in the list of the content, but include another inherent requirement of element, structure, product or device not explicitly listed in the content. In addition, the term "or" is inclusive meaning, and not exclusive meaning.

Figure 1:
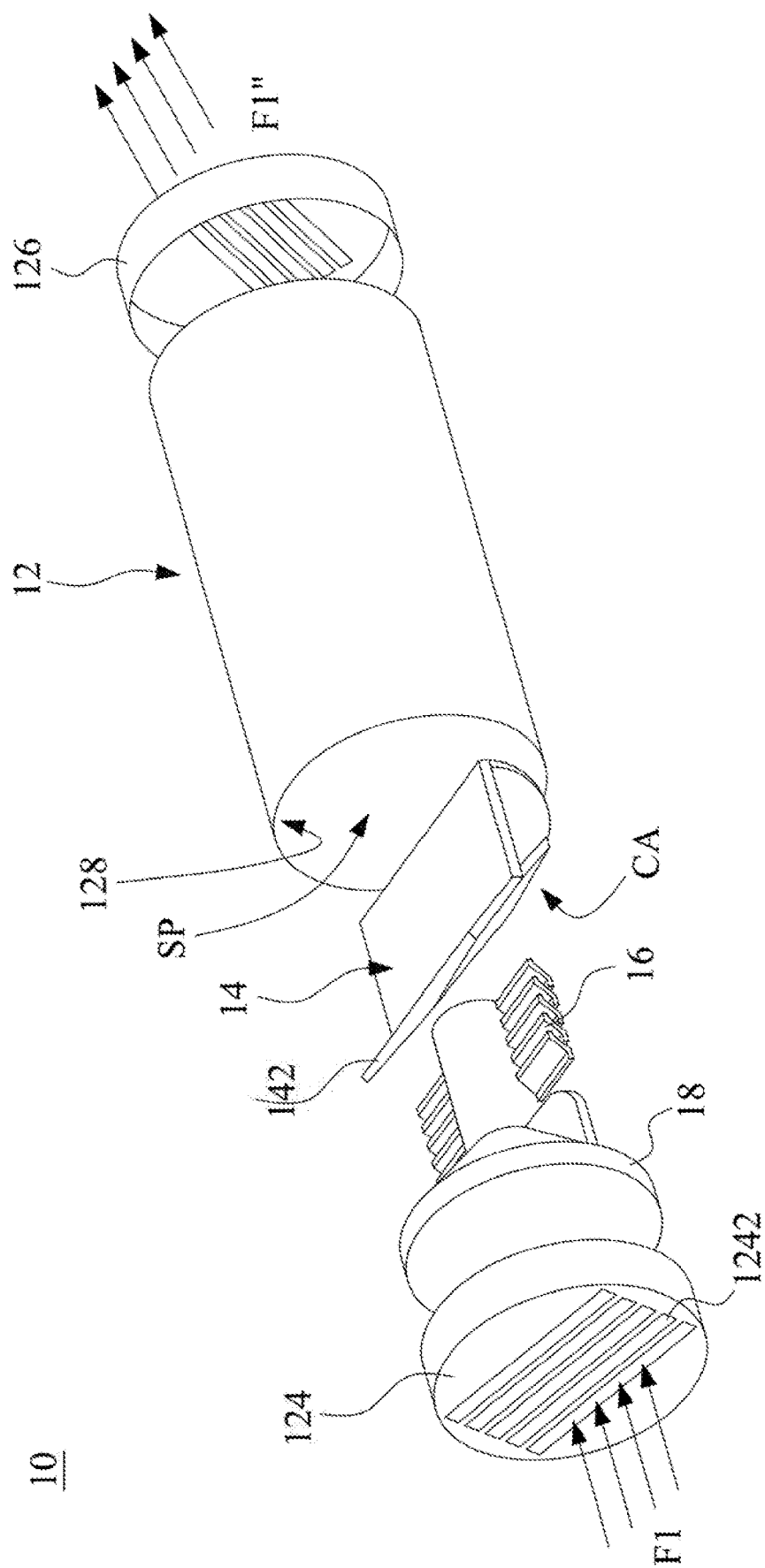
FIG. 1 is a structure diagram of a first embodiment of the filtering device of the present disclosure.

Please refer to FIG. 1, which is a structure diagram of a first embodiment of a filtering device of the present disclosure. In FIG. 1, a filtering device 10 is capable of purifying a first fluid F1 having a first flow rate, herein, the fluid F1 may be existing in the ocean, lake, artificial pool or pipeline, etc.

The filtering device 10 comprises a housing 12, a blocking member 14 and a screening member 16.

The housing 12 further includes a body 122, an inlet end 124 and an outlet end 126, for example, the material of the housing 12 may be metal or non-metal. In this embodiment, the shape of the housing 12 is a cylinder as an example for illustration purpose; in other embodiments, the shape of the housing 12 may be arbitrary subject to the actual environment or technology.

The body 122 forms an accommodating space SP. In this embodiment, the body 122 is a hollow body in which the fluid F1 flows.

The inlet end 124 and the outlet end 126 are respectively formed at two ends of the accommodating space SP. The inlet end 124 is capable of receiving fluid F1 while the outlet end 126 is capable of discharging purified fluid F1". In another embodiment, the inlet end 124 (or outlet end 126) may take on the form of a cover, where the surface of the cover may form one or a plurality of slits 1242, and by limiting the width of the slit(s) 1242, non-fluid composition (living organisms such as fish, shrimp, etc.) (herein defined as a third size) can be limited into/blocked from the filtering device 10, thereby effectively preventing negative impact on the ecosystem. The width, quantity and shape of the slit(s) 1242 are without restraints.

Figure 2:
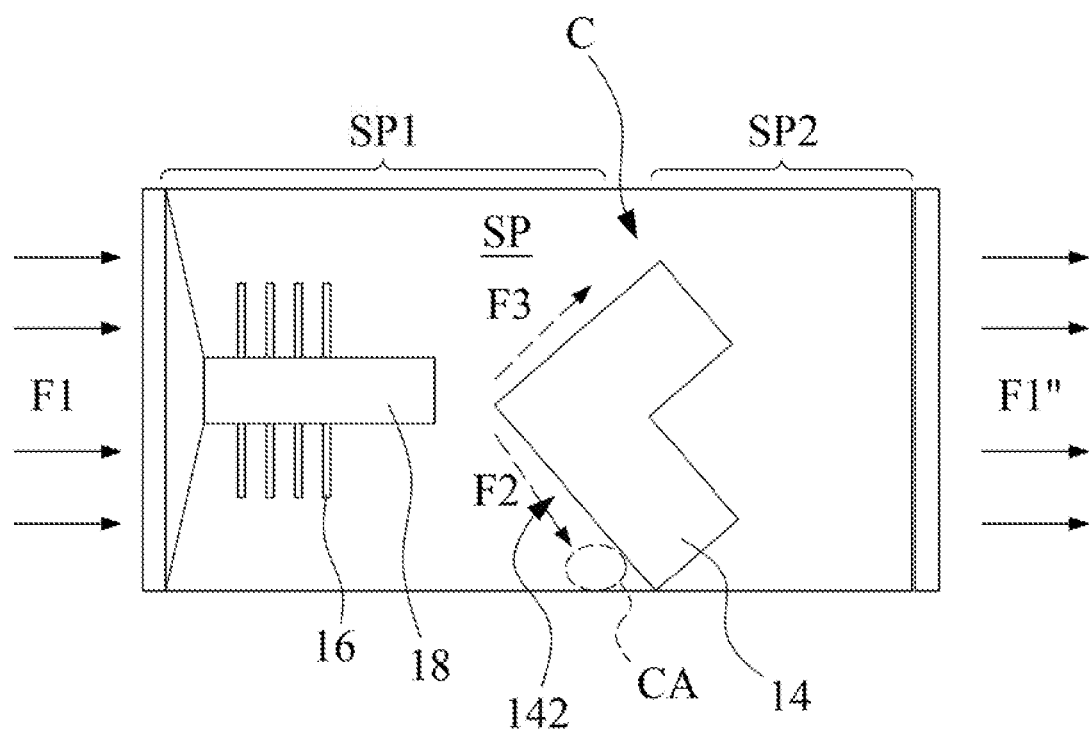
FIG. 2 is a sectional structure diagram illustrating the filtering device of FIG. 1 of the present disclosure.
Figure 3:
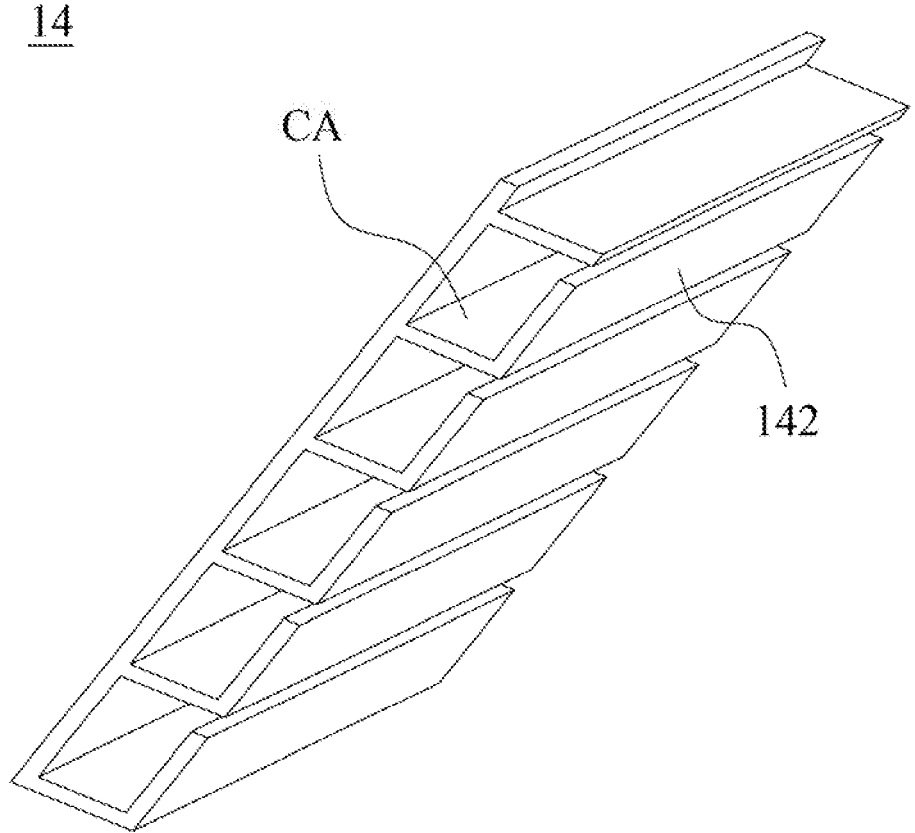
FIG. 3 is a structure diagram illustrating the blocking member of FIG. 1 of the present disclosure.

Referring also to FIG. 2, which is a sectional structure diagram of the filtering device of FIG. 1 of the present disclosure. In FIG. 2. the blocking member 14 is disposed in the accommodating space SP for dividing the accommodating space SP into a first subspace SP1 and a second subspace SP2. In this embodiment, the shape of the blocking member 14 is of a pointed arrow body providing two impact surfaces 142 which are disposed as a cone-shaped ring. The blocking member 14 is capable of splitting the fluid F1 into, for example, two secondary fluids F2, F3, and the blocking member 14 is further capable of collecting the non-fluid composition having a first size, of the secondary fluids F2, F3. In this embodiment, one end of the impact surfaces 142 are jointly connected, wherefrom the other end of each impact surface 142 extends at a certain angle, and the other end of each of the impact surfaces 142 selectively contact as inner wall 128 of the housing 12. Notably, each of the impact surfaces 142 and an inner wall 128 form a collection area CA for collecting non-fluid composition having, the first size. In another embodiment, with reference to FIG. 3, a structure diagram of the blocking member 14 of FIG. 1 of the present disclosure, the blocking member 14 provides a plurality of collection areas CA for collecting non-fluid composition having the first size.

Moreover, the blocking member 14 establishes a channel C between a first subspace SP1 and a second subspace SP2. In other words, the blocking member 14 does not completely seal off the accommodating space SP.

Figure 4:
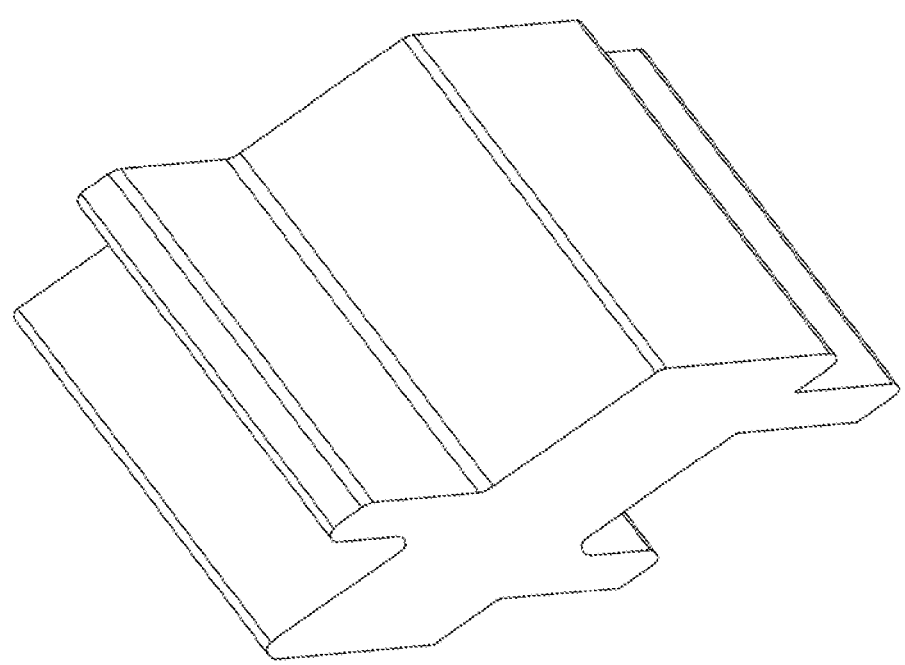
FIG. 4 is a structure diagram illustrating the screening member of FIG. 1 of the present disclosure.

The screening member 16 is disposed between the inlet end 124 and the blocking member 14 to divide the single fluid F1 into secondary fluids F2, F3. The screening member 16 is capable of receiving the secondary fluids F2, F3 (collectively called F' hereinafter) to limit the non-fluid composition having a second size of the secondary fluid to the screening member 16. Referring together with FIG. 4, a structure diagram of the screening member of FIG. 1 of the present disclosure. The screening member 16 is a multi-structure composite capable of causing the fluid F' reflected from the blocking member 14 to generate smaller swirls in the multi-structure composite, so as to limit the non-fluid composition having the second size to within the small swirls. In this embodiment, the quantity of the screening member 16 is one as an example, while in other embodiments there may be multiple screening members 16 disposed at a slant angle for the secondary fluids to generate a circulating fluid, so as to limit the non-fluid composition having the second size to flow within the circulating fluid. Furthermore, in yet another embodiment, the screening members 16 need not be limited to a particular direction (such as the x-axis direction in the embodiment) but may take on, for example, a horizontal layered arrangement, so as to enhance the capturing ability on the non-fluid composition having the second size. In this embodiment, the first size is greater than or equal to the second size.

After the secondary fluids F2, F3 pass through the blocking member 14 and the screening member 16, the secondary fluids F2, F3 enter from the first subspace SP1 into the second subspace SP2 through a channel, and then exit the outlet end 126 connected to the second subspace SP2.

Notably, the filtering device 10 further includes an accelerating component 18. The component 18 is connected in series to the inlet end 124. The accelerating component 18 is capable of adjusting the fluid F1 from a first flow rate to a second flow rate. In this embodiment, the shape of the accelerating component 18 may be that of a funnel, the diameter of one end of the accelerating component 18 adjacent to the inlet end 124 being greater than that of the other end, and the flow rate may be changed by means of reducing the diameter of the accelerating component 18, the aforesaid being applicable in an environment having ocean waves or running water; in another embodiment, the accelerating component 18 may also be electric machine (or otherwise called motor, pump, etc.), and by applying, for example, electric power, to the electric machine, the flow rate of the fluid F1 can be changed by speed pumping, the aforesaid being applicable in an environment having slow flowing or still water. In yet another embodiment, the accelerating component 18 may take on more than one form and may be a combination of the aforesaid forms.

The present disclosure is disclosed by the preferred embodiments in the aforementioned description; however, it is contemplated for one skilled at the art that the embodiments are applied only for an illustration of the present disclosure rather than are interpreted as a limitation for the scope of the present disclosure. It should be noted that the various substantial alternation or replacement equivalent to these embodiments shall be considered as being covered within the scope of the present disclosure. Therefore, the protection scope of the present disclosure shall be defined by the claims.

What is claimed is:

1. A filtering device for purifying a fluid having a first flow rate, the filtering device comprising:
    a housing comprising a body, an inlet end and an outlet end, the body forming an accommodating space, the inlet end and the outlet end being respectively formed at two ends of the accommodating space, and the inlet end receiving fluid;
    a blocking member disposed in the accommodating space, the blocking member dividing the accommodating space into a first subspace and a second subspace, the blocking member splitting the fluid into a plurality of secondary fluids and collecting a non-fluid composition which is a part of the secondary fluid and has a first size, the blocking member further establishing a channel between the first subspace and the second subspace;

an accelerating component connected in series to the inlet end, the accelerating component being used to adjust the fluid from the first flow rate to a second flow rate, wherein the fluid passes through the accelerating component to the blocking member; and a screening member disposed between the inlet end and the blocking member and on an outer periphery of the accelerating component, the screening member being configured to receive the Plurality of secondary fluids reflected from the blocking member to limit another non-fluid composition which is another part of the secondary fluids and has a second size to the screening, member;

wherein, after the secondary fluids pass through the blocking member and be reflected from the blocking member to pass through the screening member, the secondary fluids enter from the first subspace into the second subspace through the channel, and are outputted from the outlet end connected to the second subspace.

2. The filtering device according to claim 1, wherein a diameter of the accelerating component adjacent to the inlet end is greater than a diameter of the accelerating component adjacent to the blocking member.

3. The filtering device according to claim 1, wherein the inlet end further provides a cover having slits for blocking the non-fluid composition having a third size and of the secondary fluids from entering the accommodating space.

4. The filtering device according to claim 1, wherein the first size is not smaller than the second dimension size.

5. The filtering device according to claim 1, wherein the blocking member further comprising a plurality of impact surfaces, one end of the impact surfaces being jointly connected, wherefrom another end of each impact surface extends at a certain angle and selectively contacts an inner wall of the blocking member.

6. The filtering device according to claim 5, wherein each of the impact surfaces and the inner wall form a collection area for collecting non-fluid composition having the first size.

7. The filtering device according to claim 1, wherein the screening member is disposed at a location where the blocking member reflects the secondary fluids capturing the non-fluid composition having the second size.

8. The filtering device according to claim 7, wherein the number of the screening, members is plural, the screening members being disposed at a slant angle for the secondary fluids to generate a circulating fluid, so as to limit the non-fluid composition having the second size to flow within the circulating fluid.

9. The filtering device according to claim 8, wherein the screening members are arranged in layers in a horizontal or vertical direction.

* * * * *